Patented Jan. 7, 1941

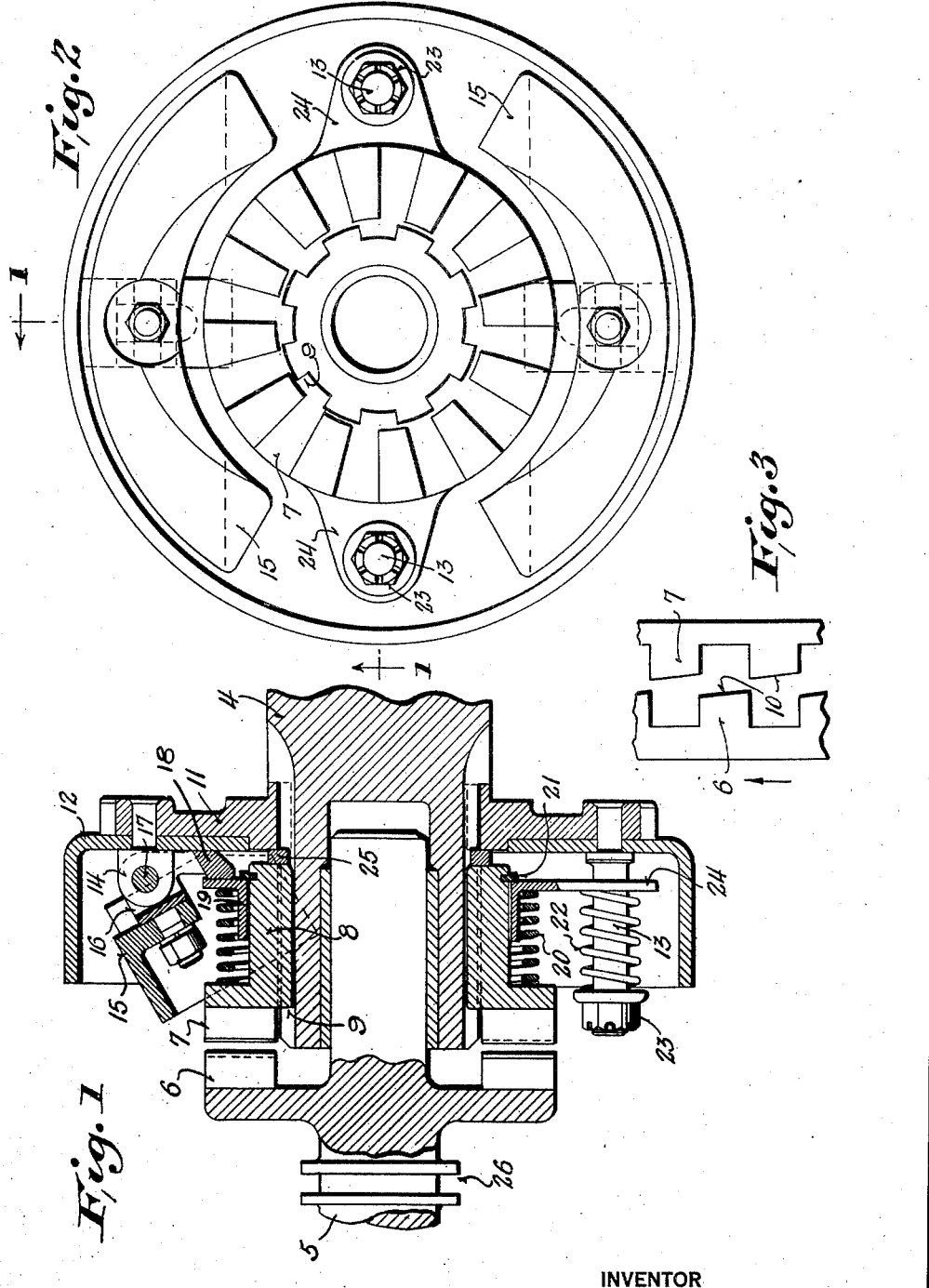

2,227,430

UNITED STATES PATENT OFFICE 2,227,430

AUTOMATIC CLUTCH MECHANISM

Oscar H. Banker, Chicago, Ill., assignor to New Products Corporation, Chicago, Ill., a corporation of Delaware Application June 9, 1934, Serial No. 729,795
Renewed April 13, 1939

9 Claims. (Cl. 192—105)

The invention relates to automatic clutch mechanism.

The object of the invention is to provide an automatic clutch in which a positive jaw clutch of the overrunning type is controlled by governor or centrifugally operated weights.

The invention further consists in the several features hereinafter set forth and more particularly defined by claims at the conclusion hereof.

In the drawing:

Fig. 1 is a composite sectional view taken on the broken line 1—1 of Fig. 2;

Fig. 2 is an elevation view of clutch mechanism embodying the invention, the driven shaft and its clutch member (as well as the drive shaft) being removed and the weights being shown in expanded position;

Fig. 3 is a detail side elevation view of the clutch members, the direction of rotation being indicated by an arrow.

Referring to the drawing, the numeral 4 designates what may be here considered as a driven shaft and 5 a drive shaft which is adapted to be directly connected to the driven shaft through the clutch mechanism hereinafter described. Under other conditions the driven shaft may be relatively stationary or may rotate relative to said drive shaft as in connection with a geared connection between said shafts as shown for example in Fig. 1 of my U. S. Patent No. 1,985,884.

The clutch connection between the shafts 4 and 5 comprises a jaw clutch having a jaw member 6 formed integral with or connected to the drive shaft 5 and a jaw member 7 having a hub 8 slidably splined at 9 on the driven shaft 4. The clutch members 6 and 7 have teeth with inclined faces 10 of the overrunning type so that if the member 7 is rotating faster than the member 6, it will move past said member and engagement will take place when the parts are synchronized.

A two-part drum comprising the disk part 11 and the dished part 12 has the part 11 splined to the driven shaft 4 and said parts are secured together by the shanks of oppositely disposed posts 13 and oppositely disposed brackets 14.

Governor weights 15 are bolted to one of the arms of levers 16 pivoted at 17 to the brackets 14, the other arms 18 of said levers engaging the back of a collar or ring member 19 slidably mounted on the hub 8 of the member 7 and normally urged by a coiled spring 22 against a stop ring 21, the spring 20 acting as a pressure transmitting connection between said collar 19 and the member 7 and also serving to resist to some extent the movement of the weighted levers (when the jaw members 6 and 7 are in their overrunning position). The movement of said levers under the action of said weights to an expanded position is mainly resisted by the springs 22 mounted on the posts 13 between the adjustable nuts 23 and bosses 24 of the ring member 19. The hub 8 of the jaw member 7 engages a stop ring 25 when the weighted levers are in contracted position.

With this construction when the speed of the driven shaft 4 reaches a certain predetermined R. P. M. the weighted levers 16 with the weights 15 swing outwardly to an expanded condition and against the action of the springs 22 and the ring member 19 is moved toward the left and through the spring 20 shifts the clutch member 7 to the left into position for engagement with the mating clutch member 6 and when the speed of these clutch members becomes synchronized, as by a temporary reduction in speed of the faster moving of the shafts, which in this case would be the drive shaft these clutch members engage. Prior to engagement the member 7 may overrun the clutch part 6 and when overrunning some energy will be stored up in the spring 20 which will be quickly released when engagement takes place. When the speed of the driven shaft 4 under these conditions falls below a certain value and the speed of the shaft 5 is temporarily decelerated to break the torque the springs 22 overcome the weights 15 and cause them to move to a contracted position and these springs also act through the collar 19 and stop ring 21 to shift the clutch member 7 out of engagement with the clutch part 6 and into the release position shown in Fig. 1.

For releasing the direct drive connection at any time and independent of the speed responsive device, manually operated means are provided for disengaging the clutch members 6 and 7 from each other, and in the present instance I have shown for this purpose a shift collar 26 associated with the drive shaft 5 so that said shaft may be moved to move the clutch member 6 out of engagement with the member 7. The shift collar is, of course, adapted to receive any suitable shifting lever for moving said shaft.

I desire it to be understood that this invention is not to be limited to any particular form or arrangement of parts except in so far as such limitations are included in the claims.

What I claim as my invention is:

1. In an automatic clutch, the combination of a rotatable drive member, a rotatable driven member, jaw clutch elements of the overrunning type for connecting said members together in driving relation including a slidably movable jaw clutch element, a support on one of said members, weighted levers pivotally mounted on said support, a ring member engaged by said levers and mounted on said movable jaw clutch element, spring means opposing the movement of said levers and acting through said ring member to move said movable clutch element to release position, and spring means forming a power transmitting connection between said movable clutch element and said ring member.

2. In an automatic clutch, the combination of a rotatable drive member, a rotatable driven member, jaw clutch elements on said members adapted, when engaged, to prevent relative rotation therebetween, to overrun in one direction before engagement and movable to a release position, means for normally urging one of said clutch elements to separated release position relative to the other, centrifugally operated means for moving one of said elements to an overrunning position and for effecting engagement of said clutch elements for positive drive when the speed of rotation of said members are synchronized, and manually operable means for shifting one of said elements relative to the other for releasing said elements from clutched engagement.

3. In an automatic clutch, the combination of a rotatable drive member, a rotatable driven member, jaw clutch elements of the overrunning type for connecting said members together in direct driving relation including a slidably movable jaw clutch element, release spring means opposing the engagement of said clutch elements, a connection between said spring means and said movable clutch element, said connection including a member movable relative to said movable clutch element, spring means opposing the movement of said connection member and acting therethrough for moving said movable element to an overrunning position and for effecting a direct engagement when the speed of rotation of said first mentioned members are synchronized, and centrifugally operable members carried by one of said first mentioned members and acting on said connection member to move the same to an overrunning position.

4. In an automatic clutch, the combination of a rotatable drive member, a rotatable driven member, jaw clutch elements adapted, when engaged, to prevent relative rotation therebetween, to overrun before engagement and to move to a release position, means for effecting disengagement of said clutch elements to a separated release position, centrifugally operated means for moving one of said elements from the release to an overrunning position and for effecting engagement of said clutch elements in a positive drive connection when said elements are synchronized and including a yielding pressure transmitting connection.

5. In an automatic clutch, the combination of a rotatable drive member, a rotatable driven member, jaw clutch elements on said members adapted for positive drive engagement to prevent relative rotation therebetween, to overrun before engagement and to move to a release position, means for effecting disengagement of said clutch elements to a separated release position, centrifugally operated means carried on said driven member and operable to move one of said elements from their released to an overrunning position and for effecting engagement of said clutch elements in a positive drive connection when the speeds of rotation of said elements are synchronized, and spring means forming a yielding pressure transmitting connection between said centrifugally operated means and one of the jaw clutch elements.

6. In an automatic clutch, the combination of a rotatable drive member, a rotatable driven member, jaw clutch elements on said members adapted for positive drive engagement to prevent relative rotation therebetween, to overrun in one direction before engagement and disengageable to a release position, means for normally urging one of said clutch elements to separated release position relative to the other, centrifugally operated means for moving one of said elements to an overrunning position and for effecting engagement of said clutch elements for positive drive when the speed of rotation of said members are synchronized, and manually operable means for shifting one of said elements relative to the other for engaging said elements independently of the condition of the centrifugally operated means.

7. In an automatic clutch, the combination of a rotatable drive member, a rotatable driven member, jaw clutch elements of the overrunning type for connecting said members together in driving relation including a slidably movable jaw clutch element splined on the driven member, a support rotatable with the driven member, weighted members movably mounted on said support, a ring member engaged by said weighted members and slidably mounted on said movable jaw clutch element, spring means opposing the movement of said levers and acting through said ring member to move said movable clutch element to release position, and spring means forming a yieldable pressure transmitting connection between said ring member and said movable clutch element.

8. In an automatic clutch, the combination of a rotatable drive member, a rotatable driven member, jaw clutch elements of the overrunning type on said members for connecting said members together in direct driving relation including a slidably movable jaw clutch element, release spring means opposing the engagement of said clutch elements, a connection between said spring means and said movable clutch element, said connection including a member movable relative to said movable clutch element and spring means intermediate said connection member and said movable clutch element opposing the movement of said connection member and acting therethrough for moving said movable clutch element to an overrunning position and for effecting a direct engagement when the speeds of rotation of said first mentioned members are synchronized, and centrifugally operable members carried by one of said first mentioned members and acting on said connection member to move the movable clutch element to an overrunning position.

9. In an automatic clutch, the combination of a rotatable drive member, a rotatable driven member having a splined end positioned adjacent said drive member and axially aligned therewith, an annular clutch element splined on said driven member and having a flange at one end provided with jaw teeth having beveled ends, a clutch element on the drive member having similarly formed teeth for engagement with the teeth of the driven clutch member, a collar slidably mounted on said annular clutch member, a coil spring surrounding said annular clutch member intermediate said collar and flange, means on the annular clutch member for limiting the movement of said collar by said spring away from said flange, a disk member secured to said driven member, centrifugally operable weight members movably mounted on said disk member and having parts engaging said collar and operable to move the collar in a clutch engaging direction when the weights move outwardly.

OSCAR H. BANKER.